(12) United States Patent
Parks et al.

(10) Patent No.: US 6,504,339 B2
(45) Date of Patent: Jan. 7, 2003

(54) TECHNIQUE AND APPARATUS TO CONTROL THE CHARGING OF A BATTERY USING A FUEL CELL

(75) Inventors: John Parks, Loudonville, NY (US);
Dustan Skidmore, Troy, NY (US);
Edward Hardwicke, Niskayuna, NY (US); James G. Hoehn, Jr., Albany, NY (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 09/779,772

(22) Filed: Feb. 8, 2001

(65) Prior Publication Data

US 2002/0105302 A1 Aug. 8, 2002

(51) Int. Cl.$^7$ ................................................. H02J 7/00
(52) U.S. Cl. ..................................................... 320/101
(58) Field of Search ................................. 320/101, 103

(56) References Cited

U.S. PATENT DOCUMENTS 6,215,272 B1 * 4/2001 Ohara et al. ................. 320/104
6,322,917 B1 * 11/2001 Acker ............................ 429/17

* cited by examiner

Primary Examiner—Gregory J. Toatley, Jr.
Assistant Examiner—Pia Tibbits
(74) Attorney, Agent, or Firm—Trop, Pruner & Hu, P.C.

(57) ABSTRACT

A technique that is usable with a fuel cell stack includes providing a fuel flow and using at least some of the fuel flow to produce power with the fuel cell stack. A request is received to charge a battery. In response to the request, the technique includes determining if the remainder of the fuel flow is sufficient to produce additional power to charge the battery. Based on the determination, the remainder of the fuel flow is used to produce the additional power to charge the battery.

20 Claims, 3 Drawing Sheets

TECHNIQUE AND APPARATUS TO CONTROL THE CHARGING OF A BATTERY USING A FUEL CELL

BACKGROUND

The invention generally relates to a technique to control the charging of a battery using a fuel cell.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

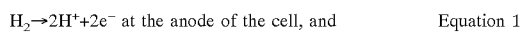

$H_2 \rightarrow 2H^+ + 2e^-$ at the anode of the cell, and    Equation 1

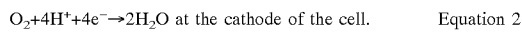

$O_2 + 4H^+ + 4e^- \rightarrow 2H_2O$ at the cathode of the cell.    Equation 2

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells. Electrically conductive gas diffusion layers (GDLs) may be located on each side of each PEM to form the anode and cathodes of each fuel cell. In this manner, reactant gases from each side of the PEM may leave the flow channels and diffuse through the GDLs to reach the PEM.

A fuel cell system may include a fuel processor that converts a hydrocarbon (natural gas or propane, as examples) into a fuel flow for the fuel cell stack. For a given output power of the fuel cell stack, the fuel flow to the stack must satisfy the appropriate stoichiometric ratios governed by the equations listed above. Thus, a controller of the fuel cell system may determine the appropriate output power from the stack and based on this determination, estimate the fuel flow to satisfy the appropriate stoichiometric ratios. In this manner, the controller regulates the fuel processor to produce this flow, and in response to controller determining that the output power should change, the controller estimates a new rate of fuel flow and controls the fuel processor accordingly.

The fuel cell system may provide power to an external load, such as a load that is formed from residential appliances and electrical devices that may be selectively turned on and off to vary the power that is consumed by the load. Thus, the power that is consumed by the load may not be constant, but rather, the power that is consumed by the load may vary over time and abruptly change in steps. For example, if the fuel cell system provides power to a house, different appliances/electrical devices of the house may be turned on and off at different times to cause the power that is consumed by the load to vary in a stepwise fashion over time.

The fuel cell system may include a battery to temporarily supplement the power that the fuel cell stack provides to the load during times when the fuel processor does not provide a sufficient level of fuel to the stack to maintain the above-described stoichiometric equations. The battery may frequently need to be charged. However, the battery may need to be charged during times when the fuel cell stack is already providing the maximum amount of power that is possible with a given level of fuel flow from the fuel processor.

Thus, there is a continuing need for an arrangement and/or technique to address one or more of the problems that are stated above.

SUMMARY

In an embodiment of the invention, a technique that is usable with a fuel cell stack includes providing a fuel flow and using at least some of the fuel flow to produce power with the fuel cell stack. A request is received to charge a battery. In response to the request, the technique includes determining if the remainder of the fuel flow is sufficient to produce additional power to charge the battery. Based on the determination, the remainder of the fuel flow is used to produce the additional power to charge the battery.

Advantages and other features of the invention will become apparent from the following description, drawing and claims.

DETAILED DESCRIPTION

Figure 1:
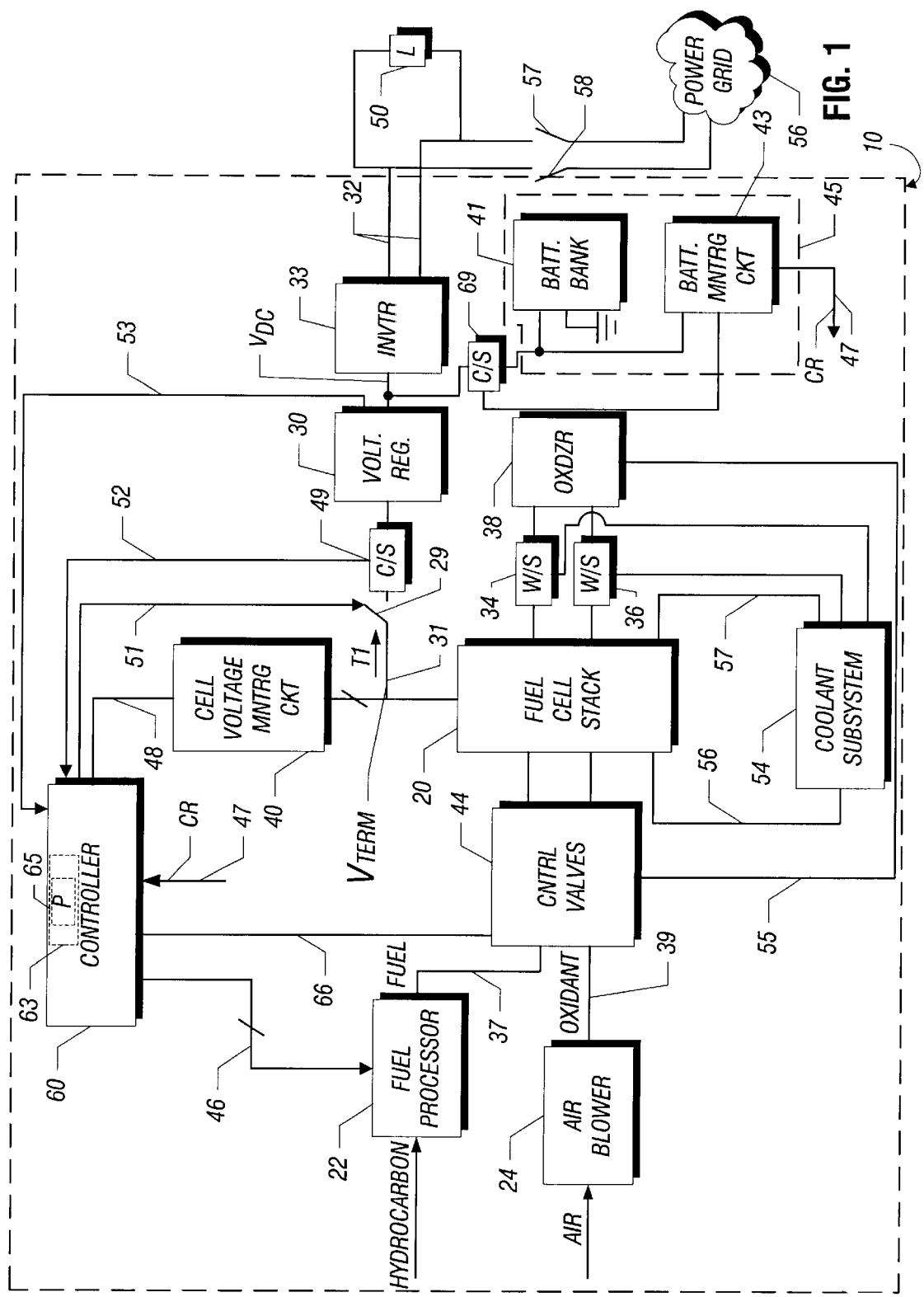
FIG. 1 is a schematic diagram of a fuel cell system according to an embodiment of the invention.

Reffering to FIG. 1, an embodiment of a fuel cell system 10 in accordance with the invention includes a fuel cell stack 20 (a PEM-type fuel cell stack, for example) that is capable of producing power for an external load 50 (a residential load, for example) and parasitic elements (valves, fans, etc.) of the system 10 in response to fuel and oxidant flows that are provided by a fuel processor 22 and an air blower 24, respectively. In this manner, the fuel cell system 10 controls the fuel production of the fuel processor 22 to control the fuel flow that is available for electrochemical reactions inside the fuel cell stack 20. Control valves 44 of the fuel cell system 10 generally route most of this fuel flow to the stack 20, with the remainder of the flow being diverted (via a conduit 55) to a flare, or oxidizer 38.

The power that is produced by the fuel cell stack 20 is consumed by the load 50, parasitic elements of the fuel cell system 20 and possibly a power grid 56 (when swithces 57 and 58 are closed, a scenario not assumed for purposes of simplifying the following description). Thus, in this manner, if the fuel flow inside the fuel cell stack 20 is sufficient to satisfy the appropriate stoichiometric relationships (defined by Eqs. 1 and 2 above), the fuel cell stack 20 produces the appropriate level of power for its loads. Unconsumed, or unreacted, fuel passes through the fuel cell stack 20 to the oxidizer 38.

The fuel cell system 10 may include a battery 45 that provides power to supplement the power that is provided by the fuel cell stack 20 when the fuel flow through the fuel cell stack 20 is not sufficient to produce enough power for its loads. However, the power boost that is provided by the battery 45 is temporary in nature, as the battery 45 stores a finite amount of charge. Therefore, after the stored energy is depleted from the battery 45, the battery 45 may need to be charged.

In some embodiments of the invention, the battery 45 may include a bank 41 of battery cells (lead acid battery cells, for example) that store the energy for the battery 45 and is charged when the battery 45 is charged. The battery 45 may also include a battery monitoring circuit 43 that provides a signal (called CR) that when asserted (driven high, for example) indicates a request to charge the battery 45, i.e., indicates a request to charge the bank 41. The battery monitoring circuit 43 may determine when the bank 41 needs to be charged by monitoring a terminal voltage (called $V_{DC}$) of the bank 41, a voltage that decreases below a predetermined threshold to indicate that charging is needed. Alternatively, the battery monitoring circuit 43 may monitor the $V_{DC}$ voltage and a current of the bank 41 (via a current sensor 69) to monitor a net charge flowing out of the battery. In this manner, when the net charge exceeds a predetermined threshold, the battery monitoring circuit 43 asserts the CR signal. The battery monitoring circuit 43 may also determine when charging is complete by monitoring the current into the battery 41 (via the current sensor 69). In this manner, when the current approaches a predefined minimum threshold level, the battery monitoring circuit 43 deems the charging to be complete and de-asserts (drives low, for example) the CR signal.

Regardless of the technique used to determine when the bank 41 needs to be charged, the fuel cell system 10 responds to the resultant charge request in a manner that coordinates the fuel that is available (if any) for charging with the charging of the bank 41. In this manner, such control factors as whether the fuel cell system 10 charges the bank 41 when requested and the rate at which the fuel cell system 10 charges the bank 41 is a function of the available fuel from the fuel processor 22 at its current operating point. Attempting to charge the bank 41 when a sufficient level of fuel is not available would result in reducing the terminal voltage of the fuel cell stack 20 below acceptable levels.

The fuel that is available for charging may vary over the operation of the fuel cell system 10, leaving times in which the bank 41 maybe charged, times in which the bank 41 cannot be charged, and times in which the bank 41 may be charged at a rate less than a maximum charge rate. The changing level of available fuel may be a function of the power that is consumed by the load 50. In this manner, the power that is consumed by the load 50 may vary over time, as the load 50 represents a collection of individual loads (appliances and/or electrical devices that are associated with a house, for example) that may each be turned on and off. As a result, the power that is consumed by the load 50 may change to produce a transient. In the context of this application, a "transient in the power consumed by the load 50" refers to a significant change in the power (that is consumed by the load 50) that deviates from the current steady state level of the power at the time the transient occurs. The transient may have a time constant that is on the same order or less than the time constant of the fuel processor 22. In the context of the application, the phrase "down transient" refers to a negative transient in the power that is consumed by the load 50, and the phrase "up transient" refers to a positive transient in the power that is consumed by the load 50.

For various reasons, the fuel processor 22 may not respond quickly to up transients, leaving times at which no additional fuel is available to produce power to charge the bank 41 should a charge request appear. As examples, the fuel processor 22 may incapable of rapidly adjusting to up transients and/or the rate at which the fuel processor 22 is permitted to increase its fuel flow output may be limited, for purposes of decreasing the level of carbon monoxide (CO) that is produced by the fuel processor 22. However, regardless of the reason for the fuel processor 22 not immediately responding to up transients, after a up transient, a period of time may exist in which the fuel processor 22 supplies an insufficient fuel flow for charging the bank 41.

Likewise, the fuel processor 22 may not respond quickly to down transients, leaving times in which additional fuel is available to produce the additional power needed for charging the bank 41. Therefore, if the request for charging is generated during these times, the fuel cell system 10 may grant the request and charge the battery 41 at the appropriate rate.

Even though a sufficient fuel flow may not be available when a charge request is generated, the fuel cell system 10 may, in response to the request, begin a process to increase the fuel output of the fuel processor 22 and defer the charging of the bank 41 until a sufficient fuel flow is available.

Figure 2:
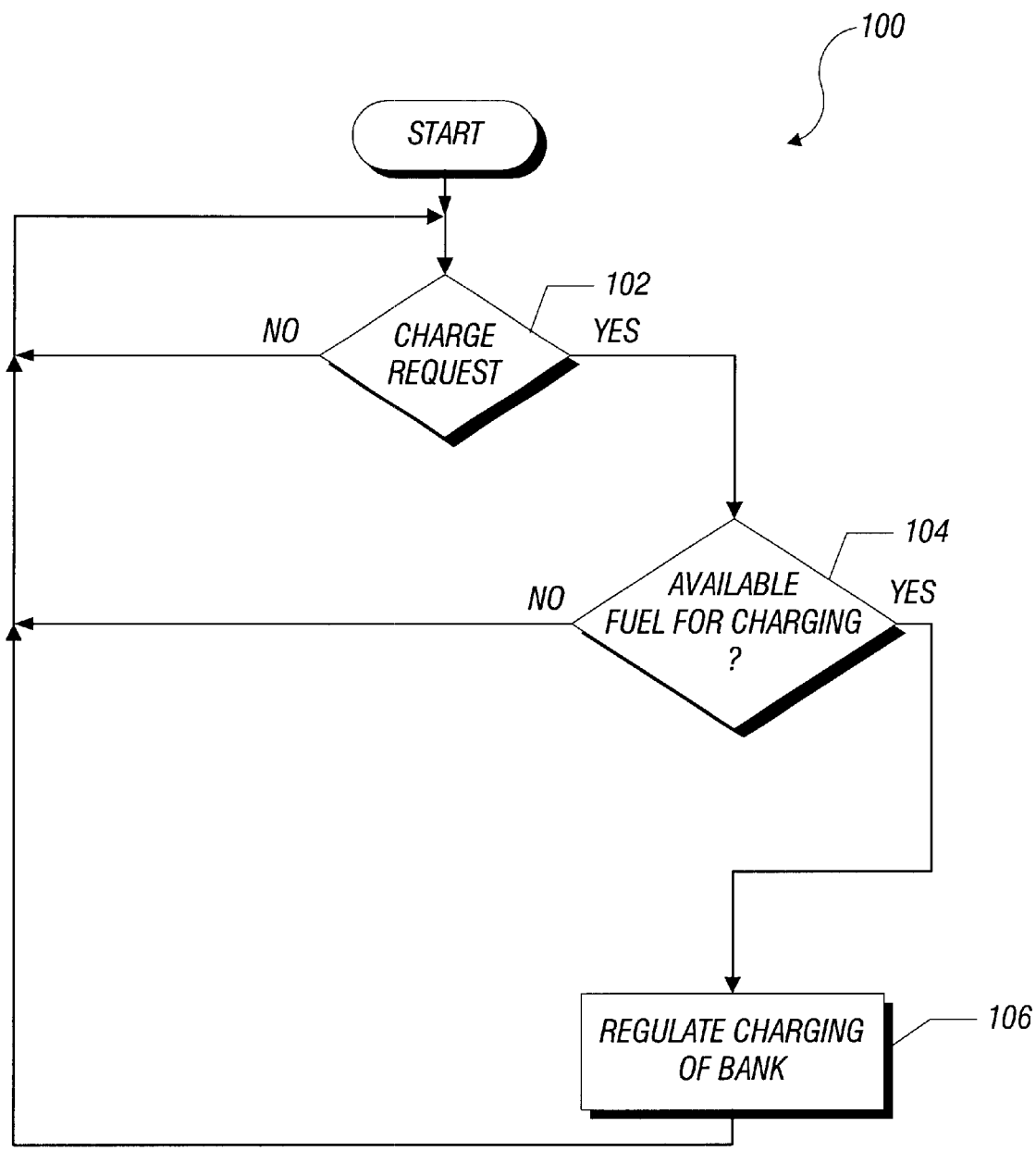
FIGS. 2 and 3 are flow diagrams depicting operation of the fuel cell system according to embodiments of the invention.

Thus, in general, the fuel cell system 10 may use a technique 100 (depicted in FIG. 2) to respond to requests to charge the bank 41. In the technique 100, the fuel cell system 10 determines (diamond 102) whether a charge request has been generated. If not, control returns to diamond 102 until a charge request is received. Otherwise, if a charge request has been received, the fuel cell system 10 determines (diamond 104) whether there is available fuel for charging the bank 41. The fuel cell system 10 may determine this by examining the power that is consumed by the load 50 and parasitic elements of the fuel cell system 10; and the fuel output of the fuel processor 22. If fuel is available for charging, then the fuel cell system 10 regulates charges the bank 41, as indicated in block 106. If fuel is not available for charging, then the fuel cell system 10 returns to diamond 102 until the bank 41 can be charged.

Referring back to FIG. 1 to describe more specific features of the fuel cell system 10, in some embodiments of the invention, the fuel cell system 10 includes a controller 60 to process charge requests; monitor the power that is consumed by the load 50 and parasitic elements of the fuel cell system 10; and regulate the charging of the bank 41 accordingly. More particularly, in some embodiments of the invention, the controller 60 monitors the power that is consumed by the load 50 and the parasitic elements of the system 10 by monitoring the cell voltages, the terminal stack voltage (called "$V_{TERM}$") and an output current (called I1) of the fuel cell stack 20. From these measurements, the controller 60 may detect up and down transients and determine the power that is being consumed from the fuel cell stack 20.

The controller 60 regulates the charging of the bank 41 by controlling (via an electrical communication line 53) a terminal voltage (called $V_{DC}$) of the bank 41 via a voltage regulator 30, a regulator 30 that is coupled between a main output terminal 31 of the fuel cell stack 20 and the battery 45. The controller 60 controls the output of the fuel processor 22 via electrical communication lines 46.

To obtain the above-described power measurements and monitor the cells of the fuel cell stack 20, the fuel cell system 10 may include a cell voltage monitoring circuit 40 to measure the cell voltages of the fuel cell stack 20 and the $V_{TERM}$ stack voltage; and a current sensor 49 to measure the I1 output current. The cell voltage monitoring circuit 40 communicates (via a serial bus 48, for example) indications of the measured cell voltages to the controller 60. The current sensor 49 is coupled in series with the output terminal 31 of the fuel cell stack 20 to provide an indication of the output current (via an electrical communication line 52). With the information about the power being consumed, the controller 60 may execute a program 65 (stored in a memory 63 of the controller 60) to process charge requests and control the charging of the bank 41.

Figure 3:
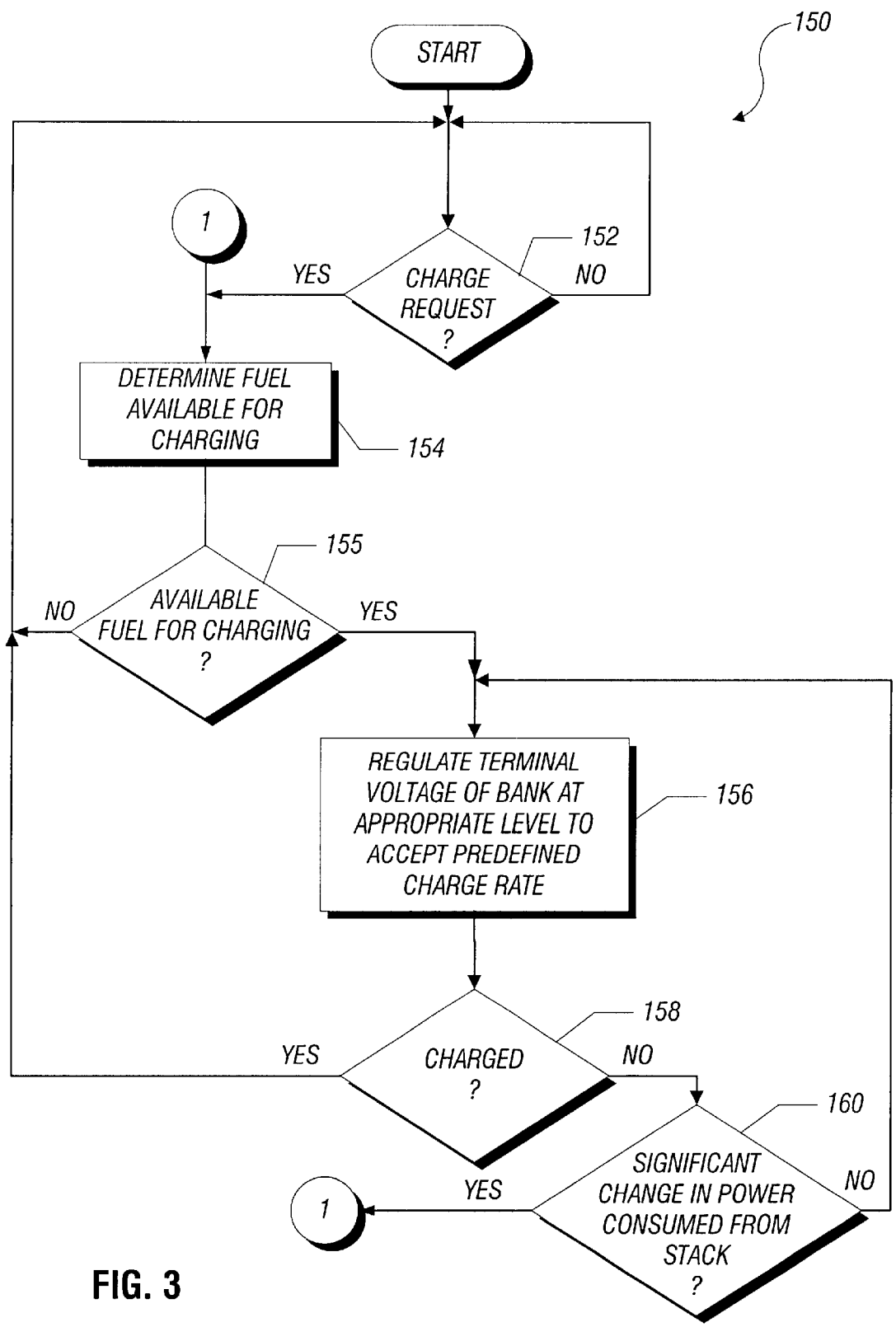

Referring to FIG. 3, in some embodiments of the invention, the program 65, when executed by the controller 60, may cause the controller 60 to perform a technique 150 to process the charge requests. In the technique 150, the controller 60 determines (diamond 152) whether a charge request needs to be processed. In this manner, a charge request may be pending until the controller 60 determines that sufficient fuel is available to charge the bank 41. If no charge request needs to be processed, control returns to diamond 152.

If a charge request needs to be processed, then the controller 60 determines (block 154) the fuel (if any) that is available for charging. If the controller 60 determines (diamond 155) that sufficient fuel is not available, the controller 60 may operate the control valves 44 (via control lines 66) to route more fuel to the fuel cell stack 20 or control the fuel processor 22 to produce more fuel, and control returns to diamond 152.

If sufficient fuel is available for charging, then the controller 60 regulates (block 156) the $V_{DC}$ terminal voltage of the bank 41 at the appropriate level to accept a predetermined charge rate. In this manner, the controller 60 may adjust the $V_{DC}$ voltage of the bank 41 to set the rate at which the bank 41 charges. In some embodiments of the invention, if enough fuel is available to provide the additional power needed for charging the bank 41 at a predefined maximum charging rate, then the controller 60 charges the bank 41 at the maximum rate. Otherwise, the controller 60 downwardly adjusts the rate based on the fuel that is available.

During the charging, the controller 60 regularly examines the CR signal to determine (diamond 158) if the bank 41 is charged. If so, control returns to diamond 152. Otherwise, the controller 60 determines (diamond 160) if the power that is consumed from the fuel cell stack 20 has significantly changed during the charging. If so, control returns to block 154 to determine if changes in the charging rate or a halt of the charging needs to occur. Otherwise, control returns to block 156.

Referring back to FIG. 1, among the other features of the fuel cell system 20, the system 20 may include the DC-to-DC voltage regulator 30 that regulates the $V_{TERM}$ stack voltage to produce the $V_{DC}$ voltage that may be used to charge the bank 41 and may be converted into an AC voltage for the load 50. In this manner, the fuel cell system 20 includes an inverter 33 that converts the $V_{DC}$ into an AC voltage that appears on output terminals 32 of the inverter 33 and system 10. Besides being controlled by the controller 60 to divert some of the fuel flow that is received by the fuel cell stack 20 to the oxidizer 38 via the flow line 55, the control valves 44 may also provide emergency shutoff of the oxidant and fuel flows to the fuel cell stack 20. The control valves 44 are coupled between inlet fuel 37 and oxidant 39 lines and the fuel and oxidant manifold inlets, respectively, to the fuel cell stack 20. The inlet fuel line 37 receives the fuel flow from the fuel processor 22, and the inlet oxidant line 39 receives the oxidant flow from the air blower 24. The fuel processor 22 receives a hydrocarbon (natural gas or propane, as examples) and converts this hydrocarbon into the fuel flow (a hydrogen flow, for example) that is provided to the fuel cell stack 20.

The fuel cell system 10 may include water separators, such as water separators 34 and 36, to recover water from the outlet and/or inlet fuel and oxidant ports of the fuel cell stack 20. The water that is collected by the water separators 34 and 36 may be routed to a water tank (not shown) of a coolant subsystem 54 of the fuel cell system 10. The coolant subsystem 54 circulates a coolant (de-ionized water, for example) through the fuel cell stack 20 to regulate the operating temperature of the stack 20. The fuel cell system 10 may also include the oxidizer 38 to burn any fuel from the stack 20 that is not consumed in the fuel cell reactions.

For purposes of isolating the load 50 from the fuel cell stack 20 during a shut down of the fuel cell system 10, the system 10 may include a switch 29 (a relay circuit, for example) that is coupled between the main output terminal 31 of the stack 20 and an input terminal of the current sensing element 49. The controller 60 may control the switch 29 via an electrical communication line 51.

In some embodiments of the invention, the controller 60 may include a microcontroller and/or a microprocessor to perform one or more of the techniques that are described herein when executing the program 65. For example, the controller 60 may include a microcontroller that includes a read only memory (ROM) that serves as the memory 63 and a storage medium to store instructions for the program 65. Other types of storage mediums may be used to store instructions of the program 65. Various analog and digital external pins of the microcontroller may be used to establish communication over the electrical communication lines 46, 51, 52 and 53; and the serial bus 48. In other embodiments of the invention, a memory that is fabricated on a separate die from the microcontroller may be used as the memory 63 and store instructions for the program 65. Other variations are possible.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method usable with a fuel cell stack, comprising:
    providing a fuel flow;
    using at least some of the fuel flow to cause the fuel cell stack to produce power, leaving a remainder of the fuel flow not being used to cause the fuel cell stack to produce the power;
    receiving a request to charge a battery;
    in response to the request, determining if the remainder is sufficient to cause the fuel cell stack to produce additional power to charge the battery; and
    based on the determination, using the remainder to produce the additional power to charge the battery.

2. The method of claim 1, further comprising:
    routing at least some of the remainder to an oxidizer.

3. The method of claim 1, further comprising:
    monitoring a terminal voltage of the battery and generating the request based on the monitoring.

4. The method of claim 1, further comprising:

monitoring a net charge flowing out of the battery and generating the request based on the monitoring.

5. The method of claim 1, further comprising:

not charging the battery if the remainder is not sufficient to produce the additional power.

6. The method of claim 1, further comprising:

regulating a terminal voltage of the battery to charge the battery.

7. The method of claim 1, further comprising:

halting the charging if the remainder becomes insufficient to produce additional power to charge the battery.

8. The method of claim 1, further comprising:

delaying the charging until the remainder is sufficient to produce the additional power to charge the battery.

9. The method of claim 1, wherein the using the remainder comprises:

regulating a rate of the charging based on the remainder.

10. The method of claim 9, wherein the regulating comprises:

regulating a terminal voltage of the battery to establish the rate.

11. A system comprising:

a fuel processor to provide a fuel flow;

a fuel cell stack using at least some of the fuel flow to cause the fuel cell stack to produce power, leaving a remainder of the fuel flow not being used to cause the fuel cell stack to produce the power;

the battery;

a circuit to generate a request to charge the battery; and a controller to:

receiving the request, in response to the request, determine if the remainder is sufficient to produce additional power to cause the fuel cell stack to charge the battery; and based on the determination, use the remainder to produce the additional power to charge the battery.

12. The system of claim 11, further comprising:

an oxidizer to receive at least some of the remainder.

13. The system of claim 11, wherein the circuit monitors a terminal voltage of the battery and generates the request based on the monitored voltage.

14. The system of claim 11, wherein the circuit monitors a net charge flowing out of the battery and generates the request based on the monitoring.

15. The system of claim 11, wherein the controller does not charge the battery if the remainder is not sufficient to produce the additional power.

16. The system of claim 11, further comprising:

a voltage regulator to regulate a terminal voltage of the battery to charge the battery.

17. The system of claim 11, wherein the controller halts the charging if the remainder becomes insufficient to produce additional power to charge the battery.

18. The system of claim 11, wherein the controller delays the charging until the remainder is sufficient to charge the battery.

19. The system of claim 11, wherein the controller regulates a rate of the charging based on the remainder.

20. The system of claim 19, wherein the controller regulates a terminal voltage of the battery to establish the rate.

* * * * *